United States Patent Office 2,820,958
Patented Jan. 21, 1958

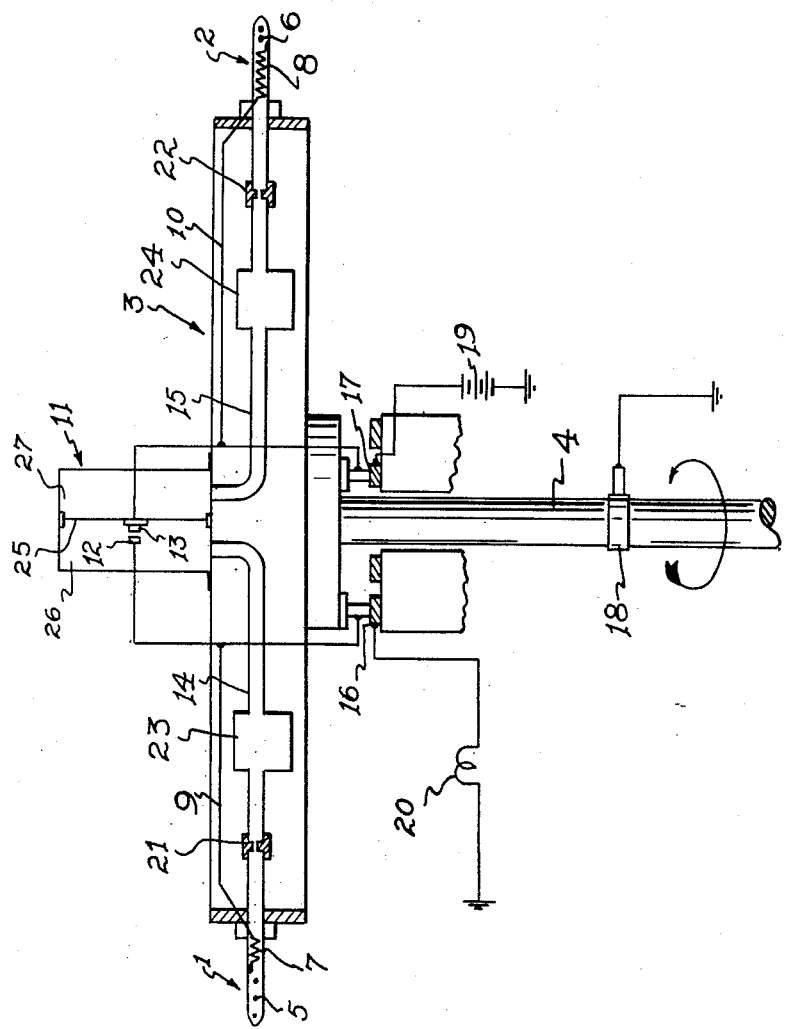

2,820,958

WHIRLING ICING DETECTOR

Donald Fraser, Ottawa, Ontario, Canada; Gladys Clayton Fraser, executrix of the estate of said Donald Fraser, deceased, assignor to National Research Council, Ottawa, Ontario, Canada, a body corporate Application May 24, 1956, Serial No. 587,089

9 Claims. (Cl. 340—234)

This invention relates to orifice-type icing detectors which can be used for both stationary and moving installations such as aircraft (including helicopters) ships and ground installations. Such detectors can be used for indicating, for example by a pilot light, the existence of icing conditions and also for the automatic actuation of icing protection of the exposed areas in respect of which the icing detector indicates the presence of icing conditions.

Existing orifice-type icing detectors for aircraft use generally consist of three basic components. The first is a detector probe exposed to the airstream, with a number of forward-facing and rearward-facing holes. The configuration of the probe and its orientation, is such that when the front holes are open the pressure in the probe has a high value consisting of the local static pressure plus a proportion of the dynamic pressure in the airstream. When the front holes are blocked by ice, the pressure in the probe has a low value consisting of the static pressure minus a proportion of the dynamic pressure. This pressure differential is caused by the fact that, when the front holes are blocked by ice, the dynamic pressure component can affect the pressure inside the probe only by means of the rearward-facing holes so that the dynamic pressure will contribute only a negative component and will therefore tend to reduce the pressure inside the detector probe.

The second element is a reference pressure source which may be a similar probe or a flush static vent, the pressure from which is arranged to be always between the high and low values of the pressures in the detector probe. The pressure indicated by such a reference pressure source must of course be kept substantially independent of the effect of the icing conditions for example, by heating the probe or static vent, or by locating them in a sheltered position so that adequate pressure differentials are developed between the detector probe and the reference pressure source when icing conditions affect the detector probe.

The third element of known orifice-type icing detectors is a diaphragm switch connected between the detector probe and the reference pressure source. This diaphragm switch is so arranged that when the detector probe pressure is higher than or equal to the reference pressure, the switch contacts remain open. When the detector probe pressure is less than the reference pressure by a given small amount, which occurs when icing conditions affect the detector probe, the switch contacts close and energize an icing warning light and also apply electrical de-icing power to the detector probe itself so that the latter will have further usefulness and indicate the extent to which main icing protection is required.

As will be apparent from the description of known orifice-type icing detectors, there are a number of conditions that must be satisfied before proper operation can be obtained. Firstly, the direction of the airstream over the probe must not vary by more than a certain amount (say plus or minus 30° about the vertical axis of the probe for a typical detector probe) in order that the correct positive and negative dynamic pressures be achieved, and also be ensured that ice is deposited on the front holes. This condition must be satisfied because the operation of the detector depends on the difference in pressure in the detector probe between no ice conditions when there is a positive component of dynamic pressure, and icing conditions when the forward-facing holes are closed off and there is negative component of dynamic pressure affecting the detector probe. The condition also means that for a given position and orientation of the detector probe, the airstream must be within relatively narrow directional limits if the icing detector is to operate satisfactorily.

Secondly, the speed of the airstream must be great enough to secure the deposit of ice on the front of the probe and to achieve the necessary amount of negative dynamic pressure to operate the pressure switch. It will be obvious that as the speed of the airstream falls a point will be reached at which the drop in pressure inside the detector probe caused by icing of the forward facing holes will be insufficient to actuate the pressure switch.

When such an orifice type icing detector is installed on an aeroplane or in a turbine-engine intake duct, these conditions are, in general, obtainable during flight or during running of the engine. However, for any installation in which the direction of the airstream with respect to the detector probe is unpredictable, such existing orifice-type icing detectors are of little use since, as discussed above, their effective operation depends on a certain minimum velocity of airstream impinging upon the detector probe from a relatively constant direction. Existing orifice-type icing detectors are therefore of limited use in indicating icing conditions on board ships, airships, helicopters or ground installations, for in all such cases the airstream may impinge upon the detector probe from any one of many possible directions and at speeds varying from zero to perhaps 200 miles per hour.

An object of the invention is to overcome a number of the disadvantages of prior icing detectors, particularly those requiring the airstream to be of a substantial velocity and to impinge upon the detector probe at a relatively constant angle.

A further object of the invention is to provide an icing detector of greater overall sensitivity.

These and other objects are achieved according to the invention by mounting the detector and reference probes on the ends of a rotating arm so that the probes are whirled through the air in such a manner that their longitudinal axes describe a substantially circular path. By so mounting the probes they are subjected to a dynamic pressure caused by the peripheral speed at the ends of the arm and assuming a substantial speed of rotation, the variations in difference of this dynamic pressure as developed in the respective probes are used, according to the invention for operating the pressure switch and thereby actuating an indicating mechanism.

An important advantage of this invention is that, by whirling the probes through the air, the device provides, so to speak, its own airstream, thereby rendering it substantially independent of the direction of the main components of ambient air velocities.

A further advantage derives from the fact that, by whirling the detector probes, a sufficiently high component of dynamic pressure is developed in the respective probes so that the whirling action is alone sufficient to actuate the pressure switch, and icing conditions will be indicated even though there is very little or a complete absence of main components of ambient air velocity.

Still another advantage of the invention arises from its use as applied to the rotors of helicopters, in respect of which the allowable limits of icing conditions are very narrow, thus requiring highly sensitive icing detectors. Additionally, because helicopters are capable of movement in any direction, it is important that the icing detector probe fulfill its purpose irrespective of the direction from which the components of ambient air velocities impinge upon it.

A still further advantage of the invention arises from its use with stationary ground installations, such as those associated with radar equipment, or installations on ships, in both of which cases icing conditions could exist even though the ambient air velocities are zero. Here known icing detectors would be of limited usefulness since the pressure difference which actuates the pressure switch depends on the existence of an ambient air velocity impinging upon the respective probes. With the present invention this limitation does not exist since the whirling action of the detector probes provides its own components of dynamic pressure and a sensitive detector of icing conditions is obtained even in the absence of wind velocities.

Further objects and features of the invention will appear from the following description with reference to the attached figure of drawings which shows the various elements of an embodiment of it.

Detector probe 1 and reference probe 2 are shown as mounted on the respective ends of rotating arm 3. The probes themselves can be of conventional design such as has been used previously in pressure operated icing detector arrangements. A preferred form of detector probe having baffles to assist in the formation of ice blocks across the orifices under all kinds of icing conditions is shown in copending United States application, Serial Number 348,243, filed April 13, 1953, and the type of detector probe shown therein has been found particularly advantageous when applied to my present invention. While the invention will yield satisfactory results if the detector and reference probes are of identical construction, better operation is secured if the reference probe is arranged to have a different number of size of orifices so that it has a lower recovery value than that of the detector probe, the term "recovery," usually expressed as a percentage, being used to indicate that proportion of the dynamic pressure against the forward-face of the probe which is actually developed inside the probe and is therefore available, by means of the pneumatic circuit, for actuation of the pressure switch contacts. Very satisfactory results have been obtained by so arranging the number, size and orientation of the orifices on the leading and trailing faces of the detector and reference probes so that the detector probe has a recovery of about 60% and the reference probe has a recovery of from 10 to 20%. For examples of design methods and characteristics of probes, reference may be made to three publications of the National Aeronautical Establishment of Canada as follows: Laboratory Report LR-3 of July 1951, "Orifice-Type Ice Detector, Preliminary Icing Tunnel Tests of Functioning as Ice Detector, Rate-of-Icing Meter, and Icing-Severity Meter" (by D. Fraser); Laboratory Report LR-71 of June 1953, "The Characteristics of an Orifice-Type Icing-Detector Probe" (by D. Fraser); and Laboratory Report LR-129 of April 1955, "Reference Pressure Probes for an Orifice-Type Icing Detector" (by D. Fraser and D. C. Baxter).

It will be obvious that the orientation of the orifices in the respective probes will depend on the direction of rotation of the arm so that the upstream orifices will be in the leading faces of the probes. For instance, for the direction of rotation shown in the drawing, the orifices 5 in detector probe 1 will be the upstream orifices and, conversely, the orifices 6 in reference probe 2 will be the downstream orifices. In the description which follows, and in the claims, it will be assumed that this limitation on the orientation of the detector and reference probes has been satisfied and that the orifices for the leading and trailing faces of the detector probes are appropriately positioned for the particular direction of rotation used.

The probes 1 and 2 are each provided with heater units 7 and 8 respectively. These units may be contained within the detector probe or can be mounted on the outside surface so long as they do not interfere with the impingement of the air on the probe orifices. In the embodiment of the invention shown, one end of each of the heater units is grounded to the detector casing and the other end of the heater unit is connected to conductors 9 and 10.

Diaphragm-type pressure switch 11 is mounted at a convenient place on arm 3. This switch is of a conventional type well known in the art having a diaphragm 25, two pressure chambers 26 and 27, and electrical contacts such as those shown at 12 and 13 which form a closed connection when the pressure in chamber 26 falls below that in chamber 27 by a predetermined amount. As shown in the drawing, the detector probe 1 is pneumatically connected to pressure chamber 26 by means of conduit 14 and the reference probe 2 is connected to pressure chamber 27 by means of conduit 15. While it is possible to use a pressure switch having a linear characteristic so that the contacts both "make" and "break" at substantially the same predetermined value of pressure difference between the chambers, it has been found advantageous to utilize a pressure switch having a hysteresis characteristic so that the pressure difference required to cause the electrical contacts to come together is less than the pressure difference required to keep them in that position and, therefore, less than the pressure difference defining the point at which they again open the circuit.

Electrical connections for supplying power for the heater units 7 and 8 and to provide leads for the switch contacts 12 and 13 are provided by slip-ring assemblies 16 and 17 which can be constructed in any well known manner so as to provide a rotatable electrical connection. In the embodiments shown a ground return lead is provided by a further slip-ring assembly 18.

When in operation the shaft 4 and hence the arm 3 and the attached probes 1 and 2 rotate in the direction indicated by the arrow. Under non-icing conditions, the battery or other source of power 19, one terminal of which is grounded, supplies power to heater 8 in reference probe 2 by means of slip-ring assemblies 17 and 18. The collector element of slip-ring 17 is also connected to contact 13 of pressure switch 11. Contact 12 of switch 11 is returned to ground through slip-ring 16 and an indicating device such as lamp 20 (mounted in any convenient location), and is also connected to heater 7 in detector probe 1 by means of conductor 9.

Under non-icing conditions all orifices will be free of obstruction and the detector and reference probes are so arranged that the pressure developed in detector probe 1 is greater than that developed in reference probe 2, with corresponding relations existing in the pressure chambers 26 and 27 which are connected to the respective probes. Since pressure switch 11 is designed and connected so that the contacts do not close until the pressure in the chamber 26 is less than that in the chamber 27 by a predetermined amount, the contacts will remain open during non-icing conditions so that neither heater 7 in the detector probe 1 nor indicating device 20 are energized. When, however, icing conditions exist, ice will form on the leading face of the detector probe 1 (since it is not heated) and will block off those orifices capable of allowing a positive element of dynamic pressure inside the tube. This substantially lowers the pressure in the detector probe side of the pneumatic circuit, and hence also lowers the pressure inside chamber 26 in switch 11, causing the contacts 12 and 13 to come together and supply current to both lamp 20 and heater 7. It may also be convenient to insert in series with lamp 20 a relay which would actuate main de-icing equipment on the surfaces in respect of which detector probe 1 indicates icing conditions.

After a period of time sufficient for heater 7 to at least partially de-ice detector probe 1, the pressure inside detector probe 1 will begin to rise and will reach a point sufficiently high that the difference in pressure between the two chambers in switch 11 is insufficient to hold the contacts together and they will accordingly break. This restores the device to its original operating condition, with neither indicating device 20 nor heater 7 connected to a source of current so that the detector probe 1 is again available as an indicator of icing conditions.

It will be obvious that in addition to a static pressure due to atmospheric air-pressure and a negative pressure due to the centrifugal pumping action caused by the rotation of the arm which affect both probes equally, and therefore cancel out, there will be one or two components of dynamic pressure effecting probes 1 and 2 depending on the presence or lack of a component of air velocity in a direction parallel to the plane of rotation of arm 3. If such a component exists, as will often be the case, it will obviously cause pulsations of pressure in probes 1 and 2 during each cycle of rotation, the maximum point of each pulse occurring when probes 1 and 2 are transverse to the main component of air velocity. This effect might cause intermittent actuation of the warning device 20 and heater 7 if there were not sufficient damping provided by the probes 1 and 2, the conduits 14 and 15 and the switch 11. In most cases, however, it has been found that probes 1 and 2 will in themselves contain sufficient pneumatic resistance and capacity to damp out the major part of the pressure fluctuations caused by components of ambient air velocity so that, particularly with a pressure switch having a hysteresis characteristic, contacts 12 and 13 will close only when there are in fact icing conditions in the air through which the probes are whirling. Should, however, the characteristics of the probes and the switch be such that the contacts have a tendency to chatter and open and close with each revolution of the arm 3, additional pneumatic resistance and capacity may readily be inserted in each of conduits 14 and 15 respectively. In the figure this pneumatic resistance and capacity is shown as orifices 21 and 22 and capacity chambers 23 and 24 respectively. It is intended that, so far as the diagram is concerned, these resistance elements 21, 22 and capacities 23, 24 represent both the internal resistance and capacity of probes 1 and 2 as well as any additional resistance and capacity which it may be found necessary to insert in the pneumatic conduits 14 and 15. The necessity for, or desirability of, such additional components is easily determined by trial methods, as it will depend on the characteristics of the probes and switch, the length and size of the pneumatic connections between them, and of course, the speed of rotation of the arm 3.

For most satisfactory operation, the arm 3 should be mounted so as to rotate in a plane approximately parallel to the main components of ambient air velocities caused, in the case of an aircraft, by movement through the air, and in the case of stationary or slow moving installations, by wind velocities. As will be obvious from the principle of operation of the device, it is necessary to rotate arm 3 at a sufficient speed to develop, even at zero ambient air velocities, changes of dynamic pressure in the detector probe between iced and non-iced conditions sufficient to operate the pressure switch.

For use on helicopters, where the present invention is particularly advantageous, the whirling arm 3 can be mounted on the main rotor, in which case the best position for the probes is at the radial distance where the rate of ice accretion on the rotor blades is a maximum. The probes, pneumatic conduits and pressure switch can, if desired, be mounted on the existing components of the rotor so that the rotor blades themselves act as the whirling arm. Alternatively, the arm can be mounted on the vertical tail rotor, or the probes can be incorporated in the components of the tail rotor, since the main components of ambient air velocity in a helicopter are along the longitudinal axis of the aircraft.

For stationary or slow moving installations such as ground installations, or on board ships, the axis of rotation should be approximately vertical since the main wind velocities are in a horizontal plane.

What I claim as my invention is:

1. A device for detecting icing conditions comprising: a reference probe adapted to be heated so as to prevent ice formation thereon, a detector probe, means mounting the said probes for rotation in synchronism so that their longitudinal axes describe circular paths, a pressure switch pneumatically connected to each of the probes, and means adapted to be actuated by said pressure switch for the purpose described when the pressure in the detector probe falls below the pressure in the reference probe by a predetermined amount.

2. A device for detecting icing conditions as claimed in claim 1, comprising: a heater adapted to heat the detector probe, and contacts adapted on actuation by the pressure switch to energize the heater.

3. A device for detecting icing conditions comprising: a rotating shaft, an arm mounted on said shaft and adapted to rotate therewith in a plane transverse to the axis of the shaft, a detector probe mounted on an end of the arm, a reference probe adapted to be heated so as to prevent ice formation thereon mounted on an end of the arm, a pressure switch pneumatically connected to each of the probes, and means adapted to be actuated by said pressure switch for the purpose described when the pressure in the detector probe falls below the pressure in the reference probe by a predetermined amount.

4. A device for detecting icing conditions as claimed in claim 3, wherein the detector probe and reference probe are mounted on the opposite ends of the arm.

5. A device for detecting icing conditions as claimed in claim 3, comprising: a heater adapted to heat the detector probe, and contacts adapted on actuation by the pressure switch to energize the heater.

6. A device for detecting icing conditions as claimed in claim 4, comprising: a heater adapted to heat the detector probe, and contacts adapted on actuation by the pressure switch to energize the heater.

7. A device for detecting icing conditions comprising: a rotating shaft, an arm mounted on said shaft and adapted to rotate therewith in a plane transverse to the axis of the shaft, a detector probe provided with a heater element mounted on one end of the arm, a reference probe adapted to be heated so as to prevent ice formation thereon mounted on the other end of the arm, a pressure switch pneumatically connected to each of the probes, said pressure switch being adapted to close electrical contacts when the pressure in the detector probe falls below that in the reference probe by a predetermined amount, the closure of said contacts actuating an indicating device and bringing into operation the heater in the detector probe so as to secure de-icing thereof.

8. A device for detecting icing conditions comprising: a rotating shaft, an arm mounted on said shaft and extending equal distances on each side thereof, said arm being adapted to rotate with the shaft in a plane substantially perependicular to the axis of the shaft, a detector probe and a reference probe extending outwardly from the respective ends of the arm in directions parallel to the longitudinal axis of the arm, the reference probe being adapted to be heated so as to prevent the formation of ice thereon, a pressure switch having hysteresis type characteristics mounted on the arm and pneumatically connected to each of the probes, at least one slipring means to provide rotatable electrical connection leading to the heaters and pressure switch contacts, said pressure switch being adapted to close its contacts when the pressure in the detector probe falls below that in the reference probe by a first predetermined amount, thereby actuating an indicating device and bringing into operation a heater which will de-ice the detector probe, said pressure switch also being adapted to open its contacts when the pressure in the detector probe rises to a value below that in the reference probe by a second predetermined amount, the first predetermined amount being greater than the second predetermined amount.

9. A device for detecting icing conditions as claimed in claim 8 wherein additional pneumatic resistance and capacity is inserted in the connection between the probes and the pressure switch so as to assist in damping out any pressure oscillations caused by the rotation of the arm.

References Cited in the file of this patent

UNITED STATES PATENTS

| | | |
|---|---|---|
| 2,494,877 | Idrac | Jan. 17, 1950 |
| 2,755,456 | Bursack | July 17, 1956 |

FOREIGN PATENTS

| | | |
|---|---|---|
| 700,641 | Great Britain | Dec. 9, 1953 |